(12) United States Patent
Eckmayr et al.

(10) Patent No.: US 9,120,922 B2
(45) Date of Patent: Sep. 1, 2015

(54) HIGH FLOW THERMOPLASTIC POLYOLEFIN WITH BALANCED MECHANICAL PERFORMANCE AND LOW SHRINKAGE AND CLTE

(71) Applicant: Borealis AG, Vienna (AT)

(72) Inventors: Renate Eckmayr, Linz (AT); Georg Grestenberger, St. Peter in der Au (AT); Gregory Potter, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 14/388,964

(22) PCT Filed: Apr. 3, 2013

(86) PCT No.: PCT/EP2013/056997
§ 371 (c)(1),
(2) Date: Sep. 29, 2014

(87) PCT Pub. No.: WO2013/150057
PCT Pub. Date: Oct. 10, 2013

(65) Prior Publication Data
US 2015/0057408 A1  Feb. 26, 2015

(30) Foreign Application Priority Data

Apr. 5, 2012  (EP) ..................... 12163287

(51) Int. Cl.
| | | |
|---|---|---|
| *C08L 23/10* | (2006.01) | |
| *C08L 23/12* | (2006.01) | |
| *C08L 23/08* | (2006.01) | |
| *C08L 23/14* | (2006.01) | |

(52) U.S. Cl.
CPC .................. *C08L 23/14* (2013.01); *C08L 23/10* (2013.01); *C08L 23/12* (2013.01); *C08L 23/08* (2013.01); *C08L 2205/02* (2013.01)

(58) Field of Classification Search
CPC ................................ C08L 23/12; C08L 23/16
USPC ........................................... 525/240; 524/528
See application file for complete search history.

(56) References Cited

U.S. PATENT DOCUMENTS

| | | | |
|---|---|---|---|
| 5,854,328 A | | 12/1998 | Koizumi et al. |
| 7,217,768 B2 * | | 5/2007 | Salek et al. ................... 525/192 |

FOREIGN PATENT DOCUMENTS

| | | |
|---|---|---|
| EP | 0 491 566 A2 | 6/1992 |
| EP | 0 586 390 A1 | 3/1994 |
| EP | 0 591 224 A1 | 4/1994 |
| EP | 0 887 379 A1 | 12/1998 |
| EP | 1 477 525 A1 | 11/2004 |
| EP | 2 338 656 A1 | 6/2011 |
| EP | 2 415 831 A1 | 2/2012 |
| EP | 2 431 416 A1 | 3/2012 |
| WO | 87/07620 A1 | 12/1987 |
| WO | 92/12182 A1 | 7/1992 |
| WO | 92/19653 A1 | 11/1992 |
| WO | 92/19658 A1 | 11/1992 |
| WO | 99/24478 A1 | 5/1999 |
| WO | 99/24479 A1 | 5/1999 |
| WO | 00/68315 A1 | 11/2000 |
| WO | 01/58970 A1 | 8/2001 |
| WO | 04/000899 A1 | 12/2003 |
| WO | 2004/026957 A1 | 4/2004 |
| WO | 2004/111095 A1 | 12/2004 |
| WO | 2010/006999 A1 | 1/2010 |

OTHER PUBLICATIONS

International Search Report for International Application No. PCT/EP201/056997, Filed Apr. 3, 2013.
Hans Zweifel, Ed. "Plastics Additives Handbook", 5th Edition, Hanser Publishers, Munich, 2001, pp. 956-965.

* cited by examiner

*Primary Examiner* — Nathan M Nutter
(74) *Attorney, Agent, or Firm* — Warn Partners, P.C.

(57) ABSTRACT

This invention relates to a thermoplastic polyolefin composition having a melt flow rate $MFR_2$ (230° C.) between 20 and 100 g/10 min, to the use of such thermoplastic polyolefin composition for the production of injection molded articles, e.g. automotive parts and to injection molded articles prepared by using such thermoplastic polyolefin composition.

28 Claims, No Drawings

HIGH FLOW THERMOPLASTIC POLYOLEFIN WITH BALANCED MECHANICAL PERFORMANCE AND LOW SHRINKAGE AND CLTE

CROSS REFERENCE TO RELATED APPLICATIONS

This application is a National Stage of International Application No. PCT/EP2013/056997, filed Apr. 3, 2013. This application claims priority to European Patent Application No. 12163287.1 filed on Apr. 5, 2012. The disclosure of the above applications are incorporated herein by reference.

This invention relates to a thermoplastic polyolefin (TPO) composition having a melt flow rate $MFR_2$ (230° C.) between 20 and 100 g/10 min measured according to ISO 1133, to the use of such thermoplastic polyolefin (TPO) composition for the production of injection moulded articles, e.g. automotive parts and to injection moulded articles prepared by using the thermoplastic polyolefin (TPO) composition.

Polypropylene is the material of choice in many applications as it can be tailored to specific purposes needed. For instance, heterophasic polypropylenes, i.e. thermoplastic polyolefins (TPOs), are widely used in the automobile industry e.g. in bumper, side trim panel, rocker panel and fender applications. In the automotive exterior applications, the shrinkage and thermal expansion of a polymer are of great importance. While the shrinkage influences the processing of a part, especially in injection moulding, the coefficient of linear thermal expansion (CLTE) is important during the lifetime of the part. In particular, the coefficient of linear thermal expansion (CLTE) determines the minimum gap width between two adjacent parts, which are usually made from different materials. In order to avoid big gap widths and high stresses in the adjacent parts the coefficient of linear thermal expansion (CLTE) should thus be as low as possible.

In the art, several attempts have been made to reduce shrinkage as well as coefficient of linear thermal expansion (CLTE) in automotive compounds, e.g. by incorporating inorganic fillers into the polymer material. For instance, EP 1 477 525 A1 relates to a polyolefin composition comprising a heterophasic propylene copolymer and a small amount of inorganic filler having an improved balance of thermal dimensional stability and impact strength at temperatures both above and below room temperature. Likewise, WO 2010/006999 A1 relates to polyolefin compositions comprising a heterophasic propylene copolymer, an inorganic filler, an ethylene/alpha-olefin elastomer and at least two different alpha-nucleating agents. U.S. Pat. No. 5,854,328 A relates to a composition comprising a polyolefin elastomer and, preferably, talc. WO 2004/026957 A1 relates to polyolefin compositions comprising high amounts of inorganic fillers.

However, the described compositions have the disadvantage that the obtained materials may suffer from poor toughness, bad appearances and difficulties in processing. It should be further noted that the weight of the obtained parts considerably increases by the incorporation of such inorganic fillers. Furthermore, to minimize the need for filler incorporation the polymer itself should feature a high dimensional stability.

Thus, the object of the present invention is to provide a polyolefin composition of low coefficient of linear thermal expansion (CLTE), low shrinkage and rather low weight, without compromising the mechanical properties of said composition.

The foregoing and other objects are solved by the provision of a thermoplastic polyolefin (TPO) composition having a melt flow rate $MFR_2$ (230° C.) between 20 and 100 g/10 min, measured according to ISO 1133, comprising a) a matrix phase (M) comprising, preferably being, a propylene homopolymer (H-PP) and/or propylene copolymer (R-PP), and b) a dispersed phase (D) comprising, preferably being, an ethylene-$C_3$-$C_8$-α-olefin rubber copolymer (EOP), wherein (i) the xylene cold soluble (XCS) fraction of the thermoplastic polyolefin composition (TPO) has
  (i-a) an ethylene content in the range of 40 wt.-% to 60 wt.-%, and
  (i-b) an intrinsic viscosity (IV) of below 1.5 dL/g measured according to ISO 1628, and (ii) the ratio of the intrinsic viscosity (IV) of xylene cold insoluble (XCI) fraction to the intrinsic viscosity (IV) of the xylene cold soluble (XCS) fraction ([XCS]/[XCI]) of the thermoplastic polyolefin (TPO) composition is in the range of 0.75 to 1.35.

In one preferred embodiment the thermoplastic polyolefin (TPO) composition according to the instant invention is α-nucleated.

The term "thermoplastic polyolefin (TPO) composition" as used in the present invention refers to a composition comprising (semi)crystalline polypropylene and an elastomer. There are two types of TPOs which essentially differ in their method of preparation. The first, which is commonly referred to as "compound grade TPO", is made by physically blending a (semi)crystalline polypropylene with an elastomer. The second, which is commonly referred to as "reactor grade TPO" is made by first polymerizing propylene to a (semi)crystalline polypropylene and then polymerizing elastomer components, such as ethylene and propylene, in the presence of the (semi)crystalline polypropylene. In any case the thermoplastic polyolefin (TPO) composition according to this invention comprises a propylene homopolymer (H-PP) or propylene copolymer (R-PP) as a polypropylene matrix and dispersed therein an ethylene-$C_3$-$C_8$-α-olefin rubber copolymer (EOP). Thus the matrix phase (M) contains (finely) dispersed inclusions being not part of the matrix phase (M) and said inclusions contain the ethylene-$C_3$-$C_8$-α-olefin rubber copolymer (EOP). The term inclusion indicates that the matrix and the inclusion form different phases within the thermoplastic polyolefin (TPO) composition, said inclusions are for instance visible by high resolution microscopy, like electron microscopy or scanning force microscopy.

In first approximation the xylene cold soluble (XCS) fraction can be seen as the rubber fraction, i.e. as the ethylene-$C_3$-$C_8$-α-olefin rubber copolymer (EOP), whereas the xylene cold insoluble (XCI) fraction is dominated by the matrix phase (M). That is because the propylene homopolymer (H-PP) and/or the propylene copolymer (R-PP) which form the matrix phase (M) are (semi)crystalline and thus only little soluble in cold xylene. On the other hand the ethylene-$C_3$-$C_8$-α-olefin rubber copolymer (EOP) is almost exclusively soluble in cold xylene. Accordingly most of the features defined herein for the matrix phase (M) are equally applicable for the xylene cold insoluble (XCI) fraction. For instance the intrinsic viscosity (IV), melt flow rate $MFR_2$ and the propylene content of the matrix phase (M) and the cold insoluble (XCI) fraction are regarded to be the same throughout the invention if not otherwise indicated. In turn the intrinsic viscosity (IV) and the ethylene content of the xylene cold soluble (XCS) fraction and the ethylene-$C_3$-$C_8$-α-olefin rubber copolymer (EOP) are regarded also to be the same throughout the invention if not otherwise indicated.

The matrix phase (M) must comprise a propylene homopolymer (H-PP) and/or a propylene copolymer (R-PP). Preferably the matrix phase (M) comprises a propylene homopolymer (H-PP). More preferably the main component of the matrix phase (M) is the propylene homopolymer (H-PP) and/or the propylene copolymer (R-PP). The term "main component of the matrix phase (M)" throughout this invention indicates that it makes up at least 50 wt.-%, more preferably at least 75 wt.-%, yet more preferably of at least 90 wt.-%, still more preferably at least 95 wt.-%, like at least 99 wt.-%, of the matrix phase (M). In one preferred embodiment the matrix phase is the propylene homopolymer (H-PP) and/or the propylene copolymer (R-PP).

Same consideration applies for the dispersed phase (D). Accordingly the dispersed phase (D) must comprise an ethylene-$C_3$-$C_8$-α-olefin rubber copolymer (EOP). More preferably the main component of the dispersed phase (D) is the ethylene-$C_3$-$C_8$-α-olefin rubber copolymer (EOP). The term "main component of the dispersed phase (D)" throughout this invention indicates that it makes up at least 50 wt.-%, more preferably at least 75 wt.-%, yet more preferably of at least 90 wt.-%, still more preferably at least 95 wt.-%, like at least 99 wt.-% of the dispersed phase (D). In one preferred embodiment the dispersed phase (D) is ethylene-$C_3$-$C_8$-α-olefin rubber copolymer (EOP).

The inventors of the present invention surprisingly found out that such a thermoplastic polyolefin (TPO) composition has superior properties compared to known compositions in this technical field. In this regard, it is noted that typically low intrinsic viscosity values have detrimental effect on mechanical performances. However, it has been found that below 1.5 dL/g, for the xylene cold soluble (XCS) fraction, i.e. for the ethylene-$C_3$-$C_8$-α-olefin rubber copolymer (EOP), by increasing the amount of rubber to a range of 30 wt.-% to 50 wt.-% (i.e. by a xylene cold soluble (XCS) fraction in the range of 25 wt.-% to 45 wt.-%), based on the total weight of the thermoplastic polyolefin (TPO) composition, and keeping the amount of ethylene monomers of the ethylene-$C_3$-$C_8$-α-olefin rubber copolymer (EOP) in the range of between 40 wt.-% and 60 wt.-% (i.e. ethylene content of xylene cold soluble (XCS) fraction in the range of 40 wt.-% and 60 wt.-%), based on the total weight of the ethylene-$C_3$-$C_8$-α-olefin rubber copolymer (EOP) (i.e. based on the total weight of the xylene cold soluble (XCS) fraction), a balanced property profile can be achieved. In particular, the shrinkage as well as the coefficient of linear thermal expansion (CLTE) values is very low without compromising the mechanical properties, like toughness and stiffness.

According to another aspect of the present invention, the use of said thermoplastic polyolefin (TPO) composition for the production of injection moulded articles, e.g. automotive parts is provided. According to a further aspect of the present invention, an injection moulded article prepared by using said thermoplastic polyolefin (TPO) composition is provided.

Advantageous embodiments of the present invention are defined in the corresponding sub-claims.

When in the following reference is made to preferred embodiments or technical details of the inventive thermoplastic polyolefin (TPO) composition, it is to be understood that these preferred embodiments or technical details also refer to the inventive use of the thermoplastic polyolefin (TPO) composition for the production of injection moulded articles, e.g. automotive parts and the inventive injection moulded article prepared by using the thermoplastic polyolefin (TPO) composition and vice versa (as far as applicable). If, for example, it is set out that the inventive thermoplastic polyolefin (TPO) composition comprises 55 wt.-% to 75 wt.-%, based on the total weight of the composition, of a matrix phase (M) also the thermoplastic polyolefin (TPO) composition of the inventive use and the inventive injection moulded article comprises 55 wt.-% to 75 wt.-%, based on the total weight of the composition, of a matrix phase (M).

The present invention will be described with respect to particular embodiments and with reference to certain figures but the invention is not limited thereto but only by the claims. Terms as set forth hereinafter are generally to be understood in their common sense unless indicated otherwise.

Where the term "comprising" is used in the present description and claims, it does not exclude other non-specified elements of major or minor functional importance. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

According to one embodiment of the present invention, the composition comprises 55 wt.-% to 70 wt.-% of a matrix phase (M) and/or 58 wt.-% to 75 wt.-% of a xylene cold insoluble (XCI) fraction. The weight percentages are based on the total weight of the thermoplastic polyolefin (TPO) composition.

According to another embodiment of the present invention, the matrix phase (M) is a propylene homopolymer.

According to yet another embodiment of the present invention, the matrix phase (M) and/or the xylene cold insoluble (XCI) has/have a melt flow rate $MFR_2$ (230° C.) of at least 50 g/10 min, preferably between 50 and 200 g/10 min, more preferably between 80 and 200 g/10 min and most preferably between 80 and 150 g/10 min, measured according to ISO 1133.

The melt flow rate $MFR_2$ (230° C.) and the intrinsic viscosity (IV) are an indirect measure of the molecular weight and thus interrelated to each other, i.e. with increase of melt flow rate the intrinsic viscosity drops. Thus it is additionally or alternatively preferred that the matrix phase (M) and/or the xylene cold insoluble (XCI) has/have an intrinsic viscosity (IV) measured according to ISO 1628 of below 1.5 dL/g, preferably between 0.7 and 1.5 dL/g, more preferably between 0.8 and 1.4 dL/g and most preferably between 0.9 and 1.3.

According to another embodiment of the present invention, the thermoplastic polyolefin (TPO) composition comprises 30 to 45 wt.-% of the ethylene-$C_3$-$C_8$-α-olefin rubber copolymer (EOP) and/or 28 to 40 wt.-% of a xylene cold soluble (XCS) fraction. The weight percentages are based on the total weight of the thermoplastic polyolefin (TPO) composition.

According to yet another embodiment of the present invention, the ethylene-$C_3$-$C_8$-α-olefin rubber copolymer (EOP) and/or the xylene cold solubles (XCS) has/have an ethylene content in the range of 40 wt.-% to 65 wt.-%, like in the range of 40 wt.-% to 60 wt.-%, preferably in the range of 40 wt.-% to 55 wt.-%, more preferably in the range of 45 wt.-% to 55 wt.-% and yet more preferably in the range of 45 wt.-% to 50 wt.-%, based on the total weight of the ethylene-$C_3$-$C_8$-α-olefin rubber copolymer (EOP).

According to one embodiment of the present invention, the ethylene-$C_3$-$C_8$-α-olefin rubber copolymer (EOP) is an ethylene-propylene or ethylene-1-octene copolymer rubber. In one preferred embodiment the ethylene-$C_3$-$C_8$-α-olefin rubber copolymer (EOP) is an ethylene-propylene copolymer rubber.

According to one embodiment of the present invention, the ethylene-$C_3$-$C_8$-α-olefin rubber copolymer (EOP) and/or the xylene cold solubles (XCS) has/have an intrinsic viscosity (IV) measured according to ISO 1628 between 0.7 and 1.5 dL/g, preferably between 0.8 and 1.4 dL/g, and most preferably between 0.9 and 1.4 dL/g.

According to another embodiment of the present invention, the thermoplastic polyolefin (TPO) composition is free of inorganic filler, like filler selected from the group consisting of talc, wollastonite, mica, chalk and mixtures thereof.

According to yet another embodiment of the present invention, the composition has a melt flow rate $MFR_2$ (230° C.) between 30 and 100 g/10 min, preferably between 30 and 90 g/10 min and more preferably between 40 and 80 g/10 min, measured according to ISO 1133.

According to one embodiment of the present invention, the ratio of intrinsic viscosity (IV) of the matrix phase (M) to the intrinsic viscosity (IV) of the ethylene-$C_3$-$C_8$-α-olefin rubber copolymer (EOP) ([M]/[EOP]) and/or the ratio of the intrinsic viscosity (IV) of xylene cold insoluble (XCI) fraction to the intrinsic viscosity (IV) of the xylene cold soluble (XCS) fraction ([XCS]/[XCI]) is in the range of 0.75 to 1.35, like in the range of 0.75 to 1.30, more preferably is in the range of 0.0 to 1.30, yet more preferable in the range of 0.80 to 1.20.

According to another embodiment of the present invention, the thermoplastic polyolefin (TPO) composition is a reactor grade thermoplastic polyolefin (rTPO) composition.

The present invention is now described in more detail:

As mentioned above the thermoplastic polyolefin (TPO) composition shall be used in particular in the field of automotive applications. In this area there is a trend to larger articles. The problem of such articles is that high pressures are needed during manufacture. To reduce pressure, the melt flow of the used material should be rather low. Accordingly, the thermoplastic polyolefin (TPO) composition of the instant invention shall have a melt flow rate $MFR_2$ (230° C.) between 20 and 100 g/10 min, measured according to ISO 1133. For example, the thermoplastic polyolefin (TPO) composition has a melt flow rate $MFR_2$ (230° C.) between 30 and 100 g/10 min, preferably between 30 and 90 g/10 min and more preferably between 40 and 80 g/10 min, measured according to ISO 1133.

As mentioned above the thermoplastic polyolefin (TPO) composition of the instant invention is featured by good mechanical properties. Accordingly, it is preferred that thermoplastic polyolefin (TPO) composition has flexural modulus of at least 850 MPa, more preferably of at least 970 MPa, yet more preferably in the range of 850 to 1,300 MPa, still more preferably in the range of 980 to 1,200 Pa. The measuring method of the flexural modulus is defined in the example section.

Furthermore, also the impact should be rather high. Accordingly it is appreciated that the thermoplastic polyolefin (TPO) composition has an Charpy impact strength at 23° C. of at least 5 $kJ/m^2$, more preferably of at least 6 $kJ/m^2$, yet more preferably in the range of 5 to 30 $kJ/m^2$, still more preferably in the range of 6 to 20 $kJ/m^2$, and/or has an impact strength at −20° C. of at least 2.2 $kJ/m^2$, more preferably of at least 3.0 $kJ/m^2$, yet more preferably in the range of 2.2 to 10 $kJ/m^2$, still more preferably in the range of 3.0 to 9 $kJ/m^2$. The measuring method of the impact strength is defined in the example section.

Concerning the thermal expansion, it is preferred that the thermoplastic polyolefin (TPO) composition has a coefficient of linear thermal expansion (CLTE) performed in a temperature range from −30 to +80° C. of below 100 μm/K, more preferably of below 96 μm/K, still more preferably below 94 μm/K and yet more preferably below 92 μm/K. For example, the thermoplastic polyolefin (TPO) composition has a coefficient of linear thermal expansion (CLTE) performed in a temperature range from −30 to +80° C. in the range of 70 to 100 μm/K, more preferably in the range of 78 to 96 μm/K, still more preferably in the range of 80 to 94 μm/K and yet more preferably in the range of 82 to 92 μm/K.

Additionally or alternatively, the thermoplastic polyolefin (TPO) composition has a coefficient of linear thermal expansion (CLTE) performed in a temperature range from +23 to +80° C. of below 110 μm/K, more preferably of below 108 μm/K, still more preferably below 106 μm/K and most preferably below 104 μm/K. For example, the thermoplastic polyolefin (TPO) composition has a coefficient of linear thermal expansion (CLTE) performed in a temperature range from +23 to +80° C. in the range of 80 to 110 μm/K, yet more preferably in the range of 82 to 108 μm/K, still more preferably in the range of 84 to 106 μm/K and most preferably in the range of 86 to 104 μm/K. The measuring method of the coefficient of linear thermal expansion (CLTE) is defined in the example section.

Concerning the shrinkage, it is preferred that the thermoplastic polyolefin (TPO) composition has a shrinkage on 60×60×2 mm specimens performed across flow of below 1.0%, more preferably of below 0.95%, still more preferably below 0.9% and most preferably below 0.85%. For example, the thermoplastic polyolefin (TPO) composition has a shrinkage on 60×60×2 mm specimens performed across flow in the range of 0.5 to 1.0%, yet more preferably in the range of 0.55 to 0.95%, still more preferably in the range of 0.6 to 0.9% and most preferably in the range of 0.65 to 0.85%.

Additionally or alternatively, the thermoplastic polyolefin (TPO) composition has a shrinkage on 60×60×2 mm specimens performed in flow of below 0.9%, more preferably of below 0.85%, still more preferably below 0.8% and most preferably below 0.75%. For example, the thermoplastic polyolefin (TPO) composition has a shrinkage on 60×60×2 mm specimens performed in flow in the range of 0.5 to 0.9%, yet more preferably in the range of 0.55 to 0.85%, still more preferably in the range of 0.6 to 0.8% and most preferably in the range of 0.65 to 0.75%.

Furthermore, it should be noted that the above properties are preferably obtained without incorporating inorganic fillers into the polymer material. Accordingly, the weight of the thermoplastic polyolefin (TPO) composition of the present invention is considerably decreased compared to compositions comprising inorganic filler.

Thus, in one embodiment the thermoplastic polyolefin (TPO) composition is free of inorganic filler, like filler selected from the group consisting of talc, wollastonite, mica, chalk and mixtures thereof. Filler are typically added in mounts of at least 5 wt.-%. Thus if it is said that the thermoplastic polyolefin (TPO) composition is free of inorganic fillers this does not mean that additives which are also used as fillers but also for other purposes like for instance as nucleating agents cannot be present. In other words if for instance talc is used to act as a nucleating agent and thus is used in an amount being not active as a filler but only as a nucleating agent, the thermoplastic polyolefin (TPO) composition is regarded to be "free of inorganic filler". More precisely the thermoplastic polyolefin (TPO) composition is "free of inorganic filler" if potential inorganic fillers are used in amounts in which they cannot act as an inorganic filler, i.e. as an additive improving the impact properties of the composition. Thus the thermoplastic polyolefin (TPO) composition is "free of inorganic filler" if potential inorganic fillers are used in amounts below 5 wt.-%, more preferably below 3 wt.-%.

As mentioned above in one preferred embodiment the thermoplastic polyolefin (TPO) composition is α-nucleated and thus may contain a α-nucleating agent.

In principle any α-nucleating agent can be used. Examples of especially suitable α-nucleating agents are selected from the group consisting of
(i) salts of monocarboxylic acids and polycarboxylic acids, e.g. sodium benzoate or aluminum tert-butylbenzoate, and
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 di(methylbenzylidene)sorbitol), or substituted nonitol-derivatives, such as 1,2,3,-trideoxy-4,6:5,7-bis-O-[(4-propylphenyl)methylene]-nonitol, and
(iii) salts of diesters of phosphoric acid, e.g. sodium 2,2'-methylenebis(4,6,-di-tert-butylphenyl)phosphate or aluminium-hydroxy-bis[2,2'-methylene-bis(4,6-di-t-butylphenyl)phosphate],
(iv) vinylcycloalkane polymer and vinylalkane polymer (as discussed above), and
(v) mixtures thereof.

However it is preferred that the α-nucleating agent is in particular selected from the group consisting of
(i) salts of monocarboxylic acids and polycarboxylic acids, e.g. sodium benzoate or aluminum tert-butylbenzoate,
(ii) dibenzylidenesorbitol (e.g. 1,3:2,4 dibenzylidenesorbitol) and $C_1$-$C_8$-alkyl-substituted dibenzylidenesorbitol derivatives, such as methyldibenzylidenesorbitol, ethyldibenzylidenesorbitol or dimethyldibenzylidenesorbitol (e.g. 1,3:2,4 bis(dimethylbenzylidene)sorbitol),
(iii) substituted nonitol-derivatives, such as 1,2,3,-trideoxy-4,6:5,7-bis-O-[(4-propylphenyl)methylene]-nonitol,
(iv) salts of diesters of phosphoric acid, e.g. sodium 2,2'-methylenebis(4,6,-di-tert-butylphenyl)phosphate or aluminium-hydroxy-bis[2,2'-methylene-bis(4,6-di-t-butylphenyl)phosphate], like aluminium-hydroxy-bis[2,2'-methylene-bis(4,6-di-tert-butylphenyl)phosphate] and Li-myristate (NA21),
(v) trisamide-benze derivatives, i.e. N-[3,5-bis-(2,2-dimethyl-propionylamino)-phenyl]-2,2-dimethyl-propionamide,
(vi) vinylcycloalkane polymer and vinylalkane polymer, and
(vii) mixtures thereof.

In a specific embodiment α-nucleating agents as listed under (ii), (iii), or (iv) of the previous paragraph are used.

Such additives are generally commercially available and are described, for example, in "Plastic Additives Handbook", 5th edition, 2001 of Hans Zweifel.

The α-nucleating agent content of the thermoplastic polyolefin (TPO) composition is preferably up to 5.0 wt.-%, e.g. below 5.0 wt.-% or below 3.0 wt.-%. In a preferred embodiment, the thermoplastic polyolefin (TPO) composition contains from equal or below 0.0001 to equal or below 1.0 wt.-%, more preferably from 0.0005 to 1.0 wt.-%, yet more preferably from 0.01 to 1.0 wt.-%, of a α-nucleating agent, in particular selected from the group consisting of dibenzylidenesorbitol (e.g. 1,3:2,4 dibenzylidene sorbitol), dibenzylidenesorbitol derivative, preferably dimethyldibenzylidenesorbitol (e.g. 1,3:2,4 di(methylbenzylidene)sorbitol), or substituted nonitol-derivatives, such as 1,2,3,-trideoxy-4,6:5,7-bis-O-[(4-propylphenyl)methylene]-nonitol, vinylcycloalkane polymer, vinylalkane polymer, and mixtures thereof. It is especially preferred that the thermoplastic polyolefin (TPO) composition contains a vinylcycloalkane, like vinylcyclohexane (VCH), polymer and/or vinylalkane polymer. Such polymer can be for instance incorporated by the so called BNT-technology is mentioned below. In such a case it is especially preferred that the thermoplastic polyolefin (TPO) composition comprises equal or less than 150 ppm, preferably 30 to 150 ppm of the α nucleating agent.

The thermoplastic polyolefin (TPO) composition is preferably prepared by first polymerizing propylene to ((semi) crystalline) polypropylene which acts as the matrix phase (M) in the TPO and subsequently polymerizing elastomer components, such as ethylene and propylene, in the presence of the ((semi)crystalline) polypropylene, obtaining thereby the rubber which is dispersed in the matrix phase (M). In principle the polypropylene which acts as the matrix phase (M) can also physically blended with the rubber. However it has been observed that better dispersion of the rubber is obtained (and thus better mechanical properties are achieved) when the thermoplastic polyolefin (TPO) composition is produced by a sequential polymerization process.

Accordingly, the thermoplastic polyolefin (TPO) composition is preferably a reactor grade thermoplastic polyolefin (rTPO) composition.

Irrespective whether the thermoplastic polyolefin (TPO) is a reactor blend or a mechanical blend, the polypropylene for the matrix phase (M) is not particularly restricted and can be a propylene homopolymer (H-PP), a propylene copolymer (R-PP) or a mixture thereof, like a mixture of a propylene homopolymer (H-PP) and a propylene copolymer (R-PP). However it is preferred that the matrix phase (M) is a propylene homopolymer (H-PP).

The expression "homopolymer" as used in the instant invention relates to a polypropylene that consists substantially, i.e. of at least 97 wt %, preferably of at least 98 wt %, more preferably of at least 99 wt %, still more preferably of at least 99.8 wt % of propylene units. In a preferred embodiment of the present invention, only propylene units in the propylene homopolymer are detectable.

The propylene homopolymer (H-PP) is preferably featured by low amounts of xylene cold soluble. Accordingly it is preferred that the propylene homopolymer (H-PP) has a xylene soluble fraction of below 4.0 wt.-%, more preferably below 3.0 wt.-%, still more preferably below 2.0 wt.-%. The same values apply for the matrix phase (M) if it is constituted by a propylene homopolymer (H-PP) only.

According to this invention, the term "propylene copolymer" and the terms elastomer, rubber, like rubber copolymer, define different embodiments. A "propylene copolymer", just as the propylene homopolymer, is a (semi)crystalline polymer and thus contains rather low amounts of xylene cold solubles (XCS) whereas the elastomer or the rubber, like the rubber copolymer, according to this invention contains considerable amounts of xylene cold solubles (XCS). More precisely the xylene cold soluble (XCS) content of the "propylene copolymer" is not more than 15 wt.-%, more preferably is not more than 10 wt.-%, whereas the xylene cold soluble (XCS) content of the elastomer or of the rubber, like of the rubber copolymer, is at least 20 wt.-%, more preferably is at least 30 wt.-%.

Accordingly the propylene copolymer (R-PP) has a xylene cold soluble (XCS) content of not more than 10 wt.-%, more preferably of not more than 8.0 wt.-%, like in the range of 3.0 to 8.0 wt.-%. The same values apply for the matrix phase (M) if it is constituted by a propylene copolymer (R-PP) only. On the other hand in case the matrix phase (M) is a mixture of a propylene homopolymer (H-PP) and a propylene copolymer (R-PP) the xylene cold soluble (XCS) may in the range of 2.0 to 7.0 wt.-%.

Where the propylene matrix phase (M) comprises a propylene copolymer or is a mixture of propylene homopolymer and propylene copolymer, the propylene copolymer comprises monomers copolymerizable with propylene, for example comonomers such as ethylene and $C_4$ to $C_{12}$ α-olefins, in particular ethylene and $C_4$ to $C_{10}$ α-olefins, e.g. 1-butene or 1-hexene. The comonomer content in the propylene matrix is in such a case preferably relatively low, i.e. up to 4.0 wt.-%, more preferably 0.1 to 3.0 wt.-%, still more preferably 0.2 to 2.0 wt.-%.

The matrix phase (M), i.e. the propylene homopolymer and/or the propylene copolymer, and/or the xylene cold insoluble (XCI) fraction may have a melt flow rate ($MFR_2$ measured under a load of 2.16 kg at 230° C. according to ISO 1133) of at least 50 g/10 min Preferably the propylene homo- or copolymer matrix phase (M) has an $MFR_2$ between 50 and 200 g/10 min, more preferably between 80 and 200 g/10 min and most preferably between 80 and 150 g/10 min, measured according to ISO 1133.

The propylene homo- or copolymer matrix phase (M) can be unimodal or multimodal, like bimodal. However, it is preferred that the propylene homo- or copolymer matrix phase (M) is unimodal.

When the matrix phase (M) is unimodal with respect to the molecular weight distribution, it may be prepared in a single stage process e.g. a slurry or gas phase process in a slurry or gas phase reactor. Preferably, the unimodal matrix phase (M) is polymerized as a slurry polymerization. Alternatively, the unimodal matrix may be produced in a multistage process using at each stage process conditions which result in similar polymer properties.

Where the matrix phase (M) comprises two or more different propylene polymers these may be polymers with different monomer make up and/or with different molecular weight distributions. These components may have identical or differing monomer compositions and tacticities.

The matrix phase (M) may therefore be prepared by various processes, for example, in a single stage or multiple stages, by such polymerization methods as slurry polymerization, gas phase polymerization, bulk polymerization, solution polymerization or a combination therefrom.

Preparation of the matrix phase (M) may also include the use of a catalyst known to those of skill in the art, such as a metallocene catalyst or a Ziegler-Natta catalyst.

The matrix phase (M) is present in the thermoplastic polyolefin (TPO) composition in an amount of 50 to 70 wt.-%, based on the total weight of the thermoplastic polyolefin (TPO) composition. Preferably, the thermoplastic polyolefin (TPO) composition comprises the matrix phase (M) in an amount of 55 to 70 wt.-%, based on the total weight of the thermoplastic polyolefin (TPO) composition. For example, the matrix phase (M) is present in the thermoplastic polyolefin (TPO) composition in an amount of 60 to 70 wt.-%, preferably in an amount of 62.5 to 70 wt.-% and most preferably in an amount of 65 to 70 wt.-%, based on the total weight of the thermoplastic polyolefin (TPO) composition.

The amount of xylene cold insoluble (XCI) fraction trends to be higher than the matrix phase (M) in the thermoplastic polyolefin (TPO) composition. Accordingly it is preferred that the xylene cold insoluble (XCI) fraction of the thermoplastic polyolefin (TPO) composition is in the range of 55 to 80 wt.-%, more preferably in the range of 60 to 75 wt.-%, yet more preferably in the range of 63 to 71 wt.-%.

Additionally or alternatively, the matrix phase (M) and/or the xylene cold insoluble (XCI) fraction has/have an intrinsic viscosity (IV; according to ISO 1628 with decalin as solvent) of below 1.5 dL/g, preferably between 0.7 and 1.5 dL/g, more preferably between 0.8 and 1.4 dL/g, more preferable between 0.9 and 1.3 dL/g and most preferably between 1 and 1.2 dL/g.

The thermoplastic polyolefin (TPO) composition according to the invention further comprises a dispersed phase (D) comprising, preferably being, an ethylene-$C_3$-$C_8$-α-olefin rubber copolymer (EOP).

In the context of the invention the terms "rubber" and "elastomer" are used synonymously.

Important aspect of the present invention is that the ethylene-$C_3$-$C_8$-α-olefin rubber copolymer (EOP) and thus the xylene cold soluble (XCS) fraction are present in the thermoplastic polyolefin (TPO) composition in rather high amounts. It has been observed that with low amounts of the ethylene-$C_3$-$C_8$-α-olefin rubber copolymer (EOP), i.e. of the xylene cold soluble (XCS) fraction, the desired improvement in the coefficient of linear thermal expansion (CLTE) and/or shrinkage cannot be achieved.

Accordingly, it is preferred that the thermoplastic polyolefin (TPO) composition comprises the ethylene-$C_3$-$C_8$-α-olefin rubber copolymer (EOP) in an amount of 30 to 50 wt.-%, based on the total weight of the thermoplastic polyolefin (TPO) composition. In one preferred embodiment of the present invention, the ethylene-$C_3$-$C_8$-α-olefin rubber copolymer (EOP) is present in the thermoplastic polyolefin (TPO) composition in an amount of 30 to 45 wt.-%, based on the total weight of the thermoplastic polyolefin (TPO) composition. For example, the ethylene-$C_3$-$C_8$-α-olefin rubber copolymer (EOP) is present in the thermoplastic polyolefin (TPO) composition in an amount of 30 to 40 wt.-%, preferably in an amount of 30 to 37.5 wt.-% and most preferably in an amount of 30 to 35 wt.-%, based on the total weight of the thermoplastic polyolefin (TPO) composition.

The amount of xylene cold soluble fraction (XCS) fraction trends to be lower than the ethylene-$C_3$-$C_8$-α-olefin rubber copolymer (EOP) in the thermoplastic polyolefin (TPO) composition. Accordingly it is preferred that the xylene cold soluble fraction (XCS) fraction of the thermoplastic polyolefin (TPO) composition is in the range of 20 to 45 wt.-%, more preferably in the range of 25 to 40 wt.-%, yet more preferably in the range of 29 to 37 wt.-%.

Additionally or alternatively, the weight ratio of the ethylene-$C_3$-$C_8$-α-olefin rubber copolymer (EOP) to the r matrix phase (M) [(EOP)/(M)] is below 1.0, more preferably below 0.9, still more preferably in the range of 0.3 to below 1.0, yet more preferably in the range of 0.4 to 0.9, still yet more preferably in the range of 0.4 to 0.8. In one preferred embodiment of the present invention, the weight ratio of ethylene-$C_3$-$C_8$-α-olefin rubber copolymer (EOP) to the matrix phase (M) [(EOP)/(M)] is in the range of 0.4 to 0.8 or in the range of 0.4 to 0.7.

One further requirement of the present invention is that the ethylene-$C_3$-$C_8$-α-olefin rubber copolymer (EOP), i.e. the xylene cold soluble fraction (XCS), contains a rather high amount of ethylene monomers.

In particular, it is required that the ethylene-$C_3$-$C_8$-α-olefin rubber copolymer (EOP) and/or the xylene cold soluble fraction (XCS) contain(s) between 40 wt.-% to 65 wt.-%, like between 40 wt.-% to 60 wt.-%, ethylene, based on the total weight of the ethylene-$C_3$-$C_8$-α-olefin rubber copolymer (EOP) and the xylene cold soluble fraction (XCS), respectively.

Preferably, the ethylene-$C_3$-$C_8$-α-olefin rubber copolymer (EOP) and/or the xylene cold soluble fraction (XCS) has/have an ethylene content in the range of 40 wt.-% to 55 wt.-%, preferably in the range of 45 wt.-% to 55 wt.-% and more preferably in the range of 45 wt.-% to 50 wt.-%, based on the total weight of the ethylene-$C_3$-$C_8$-α-olefin rubber copolymer (EOP) and the xylene cold soluble fraction (XCS), respectively.

Accordingly, it is preferred that the content of the α-olefin comonomer having 3 to 8 C-atoms, i.e. the xylene cold soluble fraction (XCS), ranges from 35 wt.-% to 60 wt.-%, like 40 wt.-% to 60 wt.-%, more preferably in the range of 45 wt.-% to 60 wt.-%, preferably in the range of 45 wt.-% to 55 wt.-%, based on the total weight of the ethylene-$C_3$-$C_8$-α-olefin rubber copolymer (EOP), i.e. the xylene cold soluble fraction (XCS).

Preferably the comonomers are selected from the group consisting of propylene, 1-butene, 1-hexene, 4-methyl-1-pentane and 1-octene. More preferably propylene, 1-butene, 1-hexene or 1-octene is used as comonomer for the ethylene-$C_3$-$C_8$-α-olefin rubber copolymer (EOP). In one embodiment the ethylene-$C_3$-$C_8$-α-olefin rubber copolymer (EOP) is an ethylene-propylene rubber (EPR).

One important requirement of the present invention is that the ethylene-$C_3$-$C_8$-α-olefin rubber copolymer (EOP) has a balanced weight average molecular weight. Small particles are formed in case the matrix and the elastomeric phase have similar molecular weight. Small particles are generally preferred, because this improves the overall properties of the thermoplastic polyolefin (TPO) composition. However, in the instant invention the matrix has by trend a high melt flow rate and thus a rather low weight average molecular weight. Accordingly, also the ethylene-$C_3$-$C_8$-α-olefin rubber copolymer (EOP) should have a low weight average molecular weight in order to obtain small particles. On the other hand this would mean in the present case a severe reduction in low weight average molecular weight for the ethylene-$C_3$-$C_8$-α-olefin rubber copolymer (EOP), which has negative impact on the mechanical properties of the overall thermoplastic polyolefin (TPO) composition. Accordingly the intrinsic viscosity must be carefully chosen.

Low intrinsic viscosity (IV) values reflect a low weight average molecular weight. Thus, it is appreciated that the ethylene-$C_3$-$C_8$-α-olefin rubber copolymer (EOP) and/or the xylene cold soluble (XCS) fraction has/have an intrinsic viscosity (IV) below 1.5 dL/g.

For example, the ethylene-$C_3$-$C_8$-α-olefin rubber copolymer (EOP) and/or the xylene cold soluble (XCS) fraction has/have an intrinsic viscosity (IV) between 0.7 and 1.5 dL/g, preferably between 0.8 and 1.5 dL/g, more preferable between 0.9 and 1.4 dL/g.

With respect to the intrinsic viscosity, it is appreciated that one specific requirement of the present invention is that the thermoplastic polyolefin (TPO) composition comprises the matrix phase (M) and the ethylene-$C_3$-$C_8$-α-olefin rubber copolymer (EOP) such that a specific ratio of intrinsic viscosity is reached. More precisely, the ratio of intrinsic viscosity (IV) of the matrix phase (M) to the intrinsic viscosity (IV) of the ethylene-$C_3$-$C_8$-α-olefin rubber copolymer (EOP) ([M]/[EOP]) in the thermoplastic polyolefin (TPO) composition shall be in the range of 0.75 to 1.35, like in the range of 0.75 to 1.30. For example, the ratio of intrinsic viscosity (IV) of the matrix phase (M) to the intrinsic viscosity (IV) of the ethylene-$C_3$-$C_8$-α-olefin rubber copolymer (EOP) in the thermoplastic polyolefin (TPO) composition ([M]/[EOP]) is in the range of 0.80 to 1.20, preferable in the range of 0.90 to 1.20.

Accordingly it is additionally or alternatively preferred that the ratio of the intrinsic viscosity (IV) of xylene cold insoluble (XCI) fraction to the intrinsic viscosity (IV) of the xylene cold soluble (XCS) fraction ([XCS]/[XCI]) of the thermoplastic polyolefin (TPO) composition is in the range of 0.75 to 1.35, like in the range of 0.75 to 1.30, more preferably in the range of 0.80 to 1.20, yet more preferable in the range of 0.90 to 1.20.

The ethylene-$C_3$-$C_8$-α-olefin rubber copolymer (EOP) may be prepared using titanium, vanadium or metallocene based catalysts capable of readily polymerizing rubbers under typical process conditions by known polymerization processes such as solution, suspension and gas-phase polymerization.

The manner in which the thermoplastic polyolefin (TPO) composition comprising the propylene homo- or copolymer matrix phase (M) and the ethylene-$C_3$-$C_8$-α-olefin rubber copolymer (EOP) as disperse phase are produced is not critical to the present invention. They can be produced by conventional melt blending of the individual components, i.e. the propylene homopolymer (H-PP) and/or the propylene copolymer (R-PP) of the matrix phase (M) and the ethylene-$C_3$-$C_8$-α-olefin rubber copolymer (EOP), by "reactor blending", by combinations of these two processes or other means which achieve good dispersion of the ethylene-$C_3$-$C_8$-α-olefin rubber copolymer (EOP) in the matrix phase (M).

Preferably the thermoplastic polyolefin (TPO) composition are produced by "reactor blending" by a multistage polymerization process such as bulk polymerization, gas phase polymerization, slurry polymerization, solution polymerization or combinations thereof using conventional catalysts. Those processes are well known to one skilled in the art.

In one preferred embodiment of the present invention, the thermoplastic polyolefin (TPO) composition is a reactor grade thermoplastic polyolefin (rTPO) composition.

A preferred process is a combination of bulk slurry loop reactor(s) and gas phase reactor(s). The propylene homopolymer (H-PP) and/or propylene copolymer (R-PP) of the matrix phase (M) can be prepared either in one or two loop reactors or in a combination of loop and gas phase reactor. The polymer produced in this way is transferred into another reactor and the disperse phase (D) comprising, preferably being, the ethylene-$C_3$-$C_8$-α-olefin rubber copolymer (EOP), is polymerized. Preferably this step is done in a gas phase polymerization.

A suitable catalyst for the polymerization of the thermoplastic polyolefin (TPO) composition is any stereospecific catalyst for propylene polymerization which is capable of polymerizing and copolymerizing propylene and comonomers at a temperature of 40 to 110° C. and at a pressure from 10 to 100 bar. Ziegler-Natta as well as metallocene catalysts are suitable catalysts. One skilled in the art is aware of the various possibilities to produce such thermoplastic polyolefin (TPO) compositions and will simply find out a suitable procedure to produce suitable thermoplastic polyolefin (TPO) compositions which are used in the present invention.

More precisely the first reactor (R1) is preferably a slurry reactor (SR) and can be any continuous or simple stirred batch tank reactor or loop reactor operating in bulk or slurry. Bulk means a polymerization in a reaction medium that comprises of at least 60% (w/w) monomer. According to the present invention the slurry reactor (SR) is preferably a (bulk) loop reactor (LR).

The second reactor (R2) and optional further reactor are preferably gas phase reactors (GPR). Such gas phase reactors (GPR) can be any mechanically mixed or fluid bed reactors. Preferably the gas phase reactors (GPR) comprise a mechanically agitated fluid bed reactor with gas velocities of at least 0.2 m/sec. Thus it is appreciated that the gas phase reactor is a fluidized bed type reactor preferably with a mechanical stirrer.

Thus in a preferred embodiment the first reactor (R1) is a slurry reactor (SR), like loop reactor (LR), whereas the second reactor (R2) and any further reactor are gas phase reactors (GPR). If needed prior to the slurry reactor (SR) a pre-polymerization reactor is placed.

A preferred multistage process is a "loop-gas phase"-process, such as developed by Borealis A/S, Denmark (known as BORSTAR® technology) described e.g. in patent literature, such as in EP 0 887 379, WO 92/12182 WO 2004/000899, WO 2004/111095, WO 99/24478, WO 99/24479 or in WO 00/68315.

A further suitable slurry-gas phase process is the Spheripol® process of Basell.

Preferably, in the instant process for producing the thermoplastic polyolefin (TPO) as defined above the conditions for the first reactor (R1), i.e. the slurry reactor (SR), like a loop reactor (LR), of step (a) may be as follows:
the temperature is within the range of 40° C. to 110° C., preferably between 60° C. and 100° C., like 68 to 90° C.,
the pressure is within the range of 20 bar to 80 bar, preferably between 40 bar to 70 bar,
hydrogen can be added for controlling the molar mass in a manner known per se.

Subsequently, the reaction mixture is transferred to the second reactor (R2), i.e. gas phase reactor (GPR-1), whereby the conditions are preferably as follows:
the temperature is within the range of 50° C. to 130° C., preferably between 60° C. and 100° C.,
the pressure is within the range of 5 bar to 50 bar, preferably between 15 bar to 35 bar,
hydrogen can be added for controlling the molar mass in a manner known per se.

The condition in any further reactor is similar to the second reactor (R2).

The residence time can vary in the three reactor zones.

In one embodiment of the process for producing the thermoplastic polyolefin (TPO) the residence time the first reactor (R1), i.e. the slurry reactor (SR), like a loop reactor (LR), is in the range 0.2 to 4 hours, e.g. 0.3 to 1.5 hours and the residence time in the gas phase reactor(s) will generally be 0.2 to 6.0 hours, like 0.5 to 4.0 hours.

If desired, the polymerization may be effected in a known manner under supercritical conditions in the first reactor (R1), i.e. in the slurry reactor (SR), like in the loop reactor (LR), and/or as a condensed mode in the gas phase reactors (GPR).

Preferably the process comprises also a prepolymerization with the catalyst system, as described in detail below, comprising a Ziegler-Natta procatalyst, an external donor and optionally a cocatalyst.

In a preferred embodiment, the prepolymerization is conducted as bulk slurry polymerization in liquid propylene, i.e. the liquid phase mainly comprises propylene, with minor amount of other reactants and optionally inert components dissolved therein.

The prepolymerization reaction is typically conducted at a temperature of 0 to 50° C., preferably from 10 to 45° C., and more preferably from 15 to 40° C.

The pressure in the prepolymerization reactor is not critical but must be sufficiently high to maintain the reaction mixture in liquid phase. Thus, the pressure may be from 20 to 100 bar, for example 30 to 70 bar.

The catalyst components are preferably all introduced to the prepolymerization step. However, where the solid catalyst component (i) and the cocatalyst (ii) can be fed separately it is possible that only a part of the cocatalyst is introduced into the prepolymerization stage and the remaining part into subsequent polymerization stages. Also in such cases it is necessary to introduce so much cocatalyst into the prepolymerization stage that a sufficient polymerization reaction is obtained therein.

It is possible to add other components also to the prepolymerization stage. Thus, hydrogen may be added into the prepolymerization stage to control the molecular weight of the prepolymer as is known in the art. Further, antistatic additive may be used to prevent the particles from adhering to each other or to the walls of the reactor.

The precise control of the prepolymerization conditions and reaction parameters is within the skill of the art.

According to the invention the thermoplastic polyolefin (TPO) is preferably obtained by a sequential polymerization process, as described above, in the presence of a catalyst system comprising a Ziegler-Natta catalyst and optionally an external donor, preferably a catalyst system comprising three components, namely as component (i) a Ziegler-Natta procatalyst, and optionally as component (ii) an organometallic cocatalyst and as component (iii) an external donor represented by formula (IIIa) or (IIIb), preferably represented by formula (IIIa).

In the following the used catalyst is defined in more detail.

The procatalyst used according to the invention is prepared by a) reacting a spray crystallized or emulsion solidified adduct of $MgCl_2$ and a $C_1$-$C_2$ alcohol with $TiCl_4$ b) reacting the product of stage a) with a dialkylphthalate of formula (I)

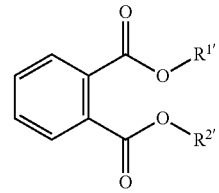

(I)

wherein $R^{1'}$ and $R^{2'}$ are independently at least a $C_5$ alkyl
under conditions where a transesterification between said $C_1$ to $C_2$ alcohol and said dialkylphthalate of formula (I) takes place to form the internal donor c) washing the product of stage b) or d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2*nROH$, wherein R is methyl or ethyl and n is 1 to 6, is formed. Ethanol is preferably used as alcohol.

The adduct, which is first melted and then spray crystallized or emulsion solidified, is used as catalyst carrier.

In the next step the spray crystallized or emulsion solidified adduct of the formula MgCl$_2$*nROH, wherein R is methyl or ethyl, preferably ethyl, and n is 1 to 6, is contacting with TiCl$_4$ to form a titanised carrier, followed by the steps of
adding to said titanised carrier
(i) a dialkylphthalate of formula (I) with R$^{1'}$ and R$^{2'}$ being independently at least a C$_5$-alkyl, like at least a C$_8$-alkyl,
or preferably
(ii) a dialkylphthalate of formula (I) with R$^{1'}$ and R$^{2'}$ being the same and being at least a C$_5$-alkyl, like at least a C$_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol-%, of a dialkylphthalate of formula (II)

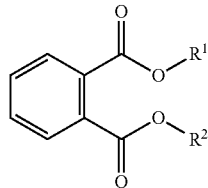

(II)

with R$^1$ and R$^2$ being methyl or ethyl, preferably ethyl, the dialkylphthalat of formula (II) being the internal donor and
recovering said transesterification product as the procatalyst composition (component (i)).

The adduct of the formula MgCl$_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed.

In case sufficient titanium remains on the carrier, it will act as an active element of the procatalyst.

Otherwise the titanization is repeated after the above treatment in order to ensure a sufficient titanium concentration and thus activity.

Preferably the procatalyst used according to the invention contains 2.5 wt.-% of titanium at the most, preferably 2.2% wt.-% at the most and more preferably 2.0 wt.-% at the most.

Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the catalyst as described in the example section; especially with the use of dioctylphthalate as dialkylphthalate of formula (I).

For the production of the thermoplastic polyolefin (TPO) according to the invention the catalyst system used preferably comprises in addition to the special Ziegler-Natta procatalyst an organometallic cocatalyst as component (ii).

Accordingly it is preferred to select the cocatalyst from the group consisting of trialkylaluminium, like triethylaluminium (TEA), dialkyl aluminium chloride and alkyl aluminium sesquichloride.

Component (iii) of the catalysts system used is an external donor represented by formula (IIIa) or (IIIb). Formula (IIIa) is defined by

Si(OCH$_3$)$_2$R$_2^5$ (IIIa)

wherein R$^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that R$^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by

Si(OCH$_2$CH$_3$)$_3$(NR$^x$R$^y$) (IIIb)

wherein R$^x$ and R$^y$ can be the same or different a represent a hydrocarbon group having 1 to 12 carbon atoms.

R$^x$ and R$^y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R$^x$ and R$^y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both R$^x$ and R$^y$ are the same, yet more preferably both R$^x$ and R$^y$ are an ethyl group.

More preferably the external donor of formula (IIIb) is diethylaminotriethoxysilane.

More preferably the external donor is selected from the group consisting of diethylaminotriethoxysilane [Si(OCH$_2$CH$_3$)$_3$(N(CH$_2$CH$_3$)$_2$)], dicyclopentyl dimethoxy silane [Si(OCH$_3$)$_2$(cyclo-pentyl)$_2$], diisopropyl dimethoxy silane [Si(OCH$_3$)$_2$(CH(CH$_3$)$_2$)$_2$] and mixtures thereof.

If desired the Ziegler-Natta procatalyst is modified by polymerizing a vinyl compound in the presence of the catalyst system, comprising the special Ziegler-Natta procatalyst (component (i)), the external donor (component (iii)) and optionally the cocatalyst (component (ii)), wherein the vinyl compound has the formula:

CH$_2$=CH—CHR$^3$R$^4$ wherein R$^3$ and R$^4$ together form a 5- or 6-membered saturated, unsaturated or aromatic ring or independently represent an alkyl group comprising 1 to 4 carbon atoms. The so modified catalyst is used for the preparation of the thermoplastic polyolefin (TPO) composition according to this invention to accomplish α-nucleation of the thermoplastic polyolefin (TPO) composition (BNT-technology).

The current invention also provides injection molded articles, like (automotive) articles, comprising at least to 60 wt.-%, more preferably at least 80 wt.-%, yet more preferably at least 95 wt.-%, like consisting, of the inventive thermoplastic polyolefin (TPO) composition. Accordingly the present invention is especially directed to automotive articles, especially to car interiors and exteriors, like bumpers, side trims, step assists, body panels, spoilers, dashboards, interior trims and the like, comprising at least to 60 wt.-%, more preferably at least 80 wt.-%, yet more preferably at least 95 wt.-%, like consisting, of the inventive thermoplastic polyolefin (TPO) composition.

The present invention will now be described in further detail by the examples provided below.

EXAMPLES

1. Definitions/Measuring Methods

The following definitions of terms and determination methods apply for the above general description of the invention as well as to the below examples unless otherwise defined.

Calculated values in case the thermoplastic polyolefin (TPO) is produced in a sequential polymerization process, i.e. in a first and optional second reactor the matrix phase (M) is produced and in a subsequent step the rubber copolymer (EOP) obtaining thereby the thermoplastic polyolefin (TPO):

Calculation of comonomer content of the rubber copolymer (EOP):

$$\frac{C(TPO) - w(M) \times C(M)}{w(EOP)} = C(EOP)$$

wherein
w(M) is the weight fraction [in wt.-%] of the matrix phase (M),
w(EPO) is the weight fraction [in wt.-%] of the rubber copolymer (EOP),
C(M) is the comonomer content [in wt.-%] of the matrix phase (M),
C(TPO) is the comonomer content [in wt.-%] of the thermoplastic polyolefin (TPO),
C(EOP) is the calculated comonomer content [in wt.-%] of the rubber copolymer (EOP).

Calculation of the xylene cold soluble (XCS) content of the rubber copolymer (EOP):

$$\frac{XS(TPO) - w(M) \times XS(M)}{w(EOP)} = XS(EOP)$$

wherein
w(M) is the weight fraction [in wt.-%] of the matrix phase (M),
w(EOP) is the weight fraction [in wt.-%] of the rubber copolymer (EOP),
XS(M) is the xylene cold soluble (XCS) content [in wt.-%] of the matrix phase (M),
XS(TPO) is the xylene cold soluble (XCS) content [in wt.-%] of the thermoplastic polyolefin (TPO),
XS(EOP) is the calculated xylene cold soluble (XCS) content [in wt.-%] of the rubber copolymer (EOP).

Calculation of melt flow rate $MFR_2$ (230° C.) of the rubber copolymer (EOP):

$$MFR(EOP) = 10^{\left[\frac{\log(MFR(TPO)) - w(M) \times \log(MFR(M))}{w(EOP)}\right]}$$

wherein
w(M) is the weight fraction [in wt.-%] of the matrix phase (M),
w(EOP) is the weight fraction [in wt.-%] of the rubber copolymer (EOP),
MFR(M) is the melt flow rate $MFR_2$ (230° C.) [in g/10 min] of the matrix phase (M),
MFR(TPO) is the melt flow rate $MFR_2$ (230° C.) [in g/10 min] of the thermoplastic polyolefin (TPO),
MFR(EOP) is the calculated melt flow rate $MFR_2$ (230° C.) [in g/10 min] of the rubber copolymer (EOP).

For calculation of the intrinsic viscosity (IV) of the rubber copolymer (EOP) the same equation can be used as for the melt flow rate.

Quantification of Comonomer Content by FTIR Spectroscopy

The comonomer content is determined by quantitative Fourier transform infrared spectroscopy (FTIR) after basic assignment calibrated via quantitative $^{13}C$ nuclear magnetic resonance (NMR) spectroscopy in a manner well known in the art. Thin films are pressed to a thickness of 250 μm and spectra recorded in transmission mode.

Specifically, the ethylene content of a polypropylene-co-ethylene copolymer is determined using the baseline corrected peak area of the quantitative bands found at 720-722 and 730-733 $cm^{-1}$. Propylene-1-butene-copolymers were evaluated at 767 $cm^{-1}$. Quantitative results are obtained based upon reference to the film thickness.

$MFR_2$ (230° C.) was measured according to ISO 1133 (230° C., 2.16 kg load).

$MFR_2$ (190° C.) was measured according to ISO 1133 (190° C., 2.16 kg load).

The content of xylene cold solubles (XCS, wt.-%) was determined at 25° C. according ISO 16152; first edition; 2005 Jul. 1. The remaining part is regarded as the xylene cold insoluble (XCI) fraction.

Intrinsic viscosity was measured according to DIN ISO 1628/1, October 1999 (in Decalin at 135° C.).

Flexural Modulus, Flexural Strength and Stain at strength were determined in 3-point-bending at 23° C. according to ISO 178 on 80×10×4 $mm^3$ test bars injection moulded in line with EN ISO 1873-2.

Charpy Impact Test:

The charpy notched impact strength (Charpy NIS) was measured according to ISO 179 2C/DIN 53453 at 23° C. and −20° C., using injection molded bar test specimens of 80×10×4 mm prepared in accordance with ISO 294-1:1996

Coefficient of Linear Thermal Expansion:

The coefficient of linear thermal expansion (CLTE) was determined in accordance with ISO 11359-2:1999 on 10 mm long pieces cut from the same injection molded specimens as used for the flexural modulus determination. The measurement was performed in a temperature range from −30 to +80° C. at a heating rate of 1° C./min. Additionally, the measurement was performed in a temperature range from +23 to +80° C. at a heating rate of 1° C./min.

Shrinkage:

The shrinkage was measured according to an internal standard using 60×60×2 mm injection molded plaques. Measurements were performed after injection and conditioning at room temperature for at least 96 h in the flow direction and perpendicular to the flow direction. Following conditions were used for injection molding: injection time: 3 s, melt temperature: 240° C., mold temperature: 50° C., hold pressure: from 73 to 23 bars in 10 steps, hold time: 10 s, cooling time: 20 s.

2. Examples

Examples IE1 and IE2 were accomplished on a 21.3 L autoclave equipped with control valves for dosing the reactor with monomers, hydrogen and for flashing. The dosage of monomers and hydrogen into the reactor was monitored by flow controllers and also by monitoring the mass of their respective reservoirs. The temperature of the reactors was controlled via cooling/heating of water in the double jacket around the reactors including sensors in both the top and bottom of the reactor. Helical stirrers with magnetic coupling were used for effective mixing inside the reactor and the stirring rates could be varied during the course of the reaction. The entire process was programmed ahead of time, executed and monitored by work station computers outside of the reactor cabins.

General Polymerisation Conditions

The catalyst used in the polymerization process for examples IE1 and IE2 has been produced as follows: First, 0.1 mol of $MgCl_2 \times 3$ EtOH was suspended under inert conditions in 250 ml of decane in a reactor at atmospheric pressure. The solution was cooled to the temperature of −15° C. and 300 ml of cold $TiCl_4$ was added while maintaining the temperature at said level. Then, the temperature of the slurry was increased slowly to 20° C. At this temperature, 0.02 mol of dioctylphthalate (DOP) was added to the slurry. After the addition of the phthalate, the temperature was raised to 135° C. during 90 minutes and the slurry was allowed to stand for 60 minutes. Then, another 300 ml of $TiCl_4$ was added and the temperature was kept at 135° C. for 120 minutes. After this, the catalyst was filtered from the liquid and washed six times with 300 ml heptane at 80° C. Then, the solid catalyst component was filtered and dried. Catalyst and its preparation concept is described in general e.g. in patent publications EP491566, EP591224 and EP586390. The catalyst was prepolymerized with vinyl cyclohexane in an amount to achieve a concentration of 200 ppm poly(vinyl cyclohexane) (PVCH) in the final polymer. As co-catalyst triethyl-aluminium (TEAL) and as donor diethylamino triethoxy silane (U-donor) were used. The aluminium to donor ratio is indicated in table 1.

Bulk:

The reactor is initially purged with propylene and then filled with 5250 g of propylene and 6 liters of Hydrogen for the pre-polymerisation. The catalyst as described in the previous paragraph was mixed with a solution of TEAL and U-donor at a set ratio for 5 minutes before being added to the reactor. The catalyst loading vessel is then flushed with 250 g propylene to ensure all of the catalyst mixture is added to the reactor. The reactor then undergoes prepolymerisation at 23° C. for 6 minutes while stirring at 350 rpm. Subsequently, the reactor is heated up to 85° C. to initiate bulk conditions. While in transition the desired amount of hydrogen is added to the reactor via a flow controller. Hydrogen is always added in bulk and not added continuously during the reaction. Once the desired reactor conditioners are reached, the reactor is held at a constant pressure by dosing with propylene. This transition time to reach the bulk conditions was typically ~19 minutes. After the specified bulk residence time, the reactor is purged to 0.5 bar with a stirring speed of 100 rpm to continue to a gas phase step.

GPR 1

Once the desired purge pressure (0.5 bar) was achieved, the transition to the final gas phase (GPR 1) began. The stirring rate of the reactor was increased to 350 rpm and the reactor was dosed with propylene, ethylene and hydrogen as the temperature and pressure were increased to 85° C. and 21 bar, respectively. The transition time between loop and GPR1 was typically between 8 to 10 minutes. The comonomers were added to maintain a desired gas ratio. Once the reactor reached the desired temperature, the pressure was held constant at 21 bar by dosing with ethylene/propylene at the appropriate gas ratio. The amount of polymer being produced could be monitored by measuring the amount of propylene and ethylene added during the course of the reaction. After a desired split level was reached, the reactor followed the termination procedure outlined below.

Reaction Termination:

After the reaction is completed the stirring speed is reduced to 100 rpm and the gas mixture purged from the reactor to 0 barg. Residual gases are removed from the reactor (as well as the polymer particles) by treating the reactor with several vacuum cycles. This cycle involves put the reactor under vacuum for several minutes, filling up to ambient pressures with nitrogen and then repeating the process several times. The product is then safely removed from the reactor.

The analytics of the prepared samples can be gathered from Table 1.

TABLE 1

|  |  | IE1 | IE2 | CE1 | CE3 |
|---|---|---|---|---|---|
| TEAL/U-donor Loop | [mol/mol] | 6 | 6 | — | — |
| $H_2/C3$ ratio | [mol/kmol] | 13.6 | 13.6 | — | — |
| C2/C3 ratio | [mol/kmol] | 0 | 0 | — | — |
| $MFR_2$ | [g/10 min] | 112 | 112 | 250 | 40 |
| IV | [dl/g] | 1.1 | 1.1 | 0.9 | 1.4 |
| C2 content | [wt.-%] | 0 | 0 | 0 | 0 |
| 1 GPR/Final |  |  |  |  |  |
| $H_2/C2$ ratio | [mol/kmol] | 293 | 300 | — | — |
| C2/C3 ratio | [mol/kmol] | 943 | 1036 | — | — |
| $MFR_2$ | [g/10 min] | 60 | 67 | 35 | 12 |
| C2 content | [wt.-%] | 22.3 | 21.8 | 27.8 | 16.0 |
| XCS | [wt.-%] | 33.0 | 32.9 | 27.8 | 30.0 |
| C2 of XCS | [wt.-%] | 49.2 | 48.8 | 32.8 | 37.0 |
| IV of XCS | [dl/g] | 1.2 | 1.3 | 3.1 | 2.2 |
| IV of XCI | [dl/g] | 1.1 | 1.1 | 0.9 | 1.4 |
| Split Loop/1GPR | [wt.-%] | 60/40 | 61/39 | — | — |

CE1 = commercial product EG001AE of Borealis AG with PP homopolymer matrix MFR = 250 g/10 min
CE3 = commercial product EE041AE of Borealis AG with PP homopolymer matrix MFR = 40 g/10 min CE2 with a $MFR_2$ (230° C.) of 32 g/10 min corresponds to CE1, further comprising 16 wt.-% of the commercial high density polyethylene product MG 9601 of Borealis AG having a $MFR_2$ (190° C./2.16 kg) of 31 g/10 min and a density of 960 kg/m$^3$.

The results for the prepared samples can be gathered from Table 2.

TABLE 2

|  |  | IE1 | IE2 | CE1 | CE2 | CE3 |
|---|---|---|---|---|---|---|
| Shrinkage in flow | [%] | 0.73 | 0.71 | 1.27 | 0.98 | 0.71 |
| Shrinkage across flow | [%] | 0.83 | 0.77 | 1.37 | 1.11 | 0.87 |
| CLTE +23/80 | [μm/K] | 101 | 96 | 127 | 109 | 105 |
| CLTE −30/80 | [μm/K] | 90 | 88 | 110 | 96 | 89 |
| Flexural Modulus | [MPa] | 1062 | 1059 | 969 | 957 | 808 |
| Flexural Strength | [MPa] | 24 | 24.1 | 25.4 | 23.6 | 21.3 |
| Strain at strength | [%] | 5.4 | 5.5 | 6.2 | 6.2 | 6.4 |
| Stress at 3.5% strain | [MPa] | 22.2 | 22.4 | 22.4 | 20.9 | 18.8 |
| Charpy NIS +23° C. | [kJ/m$^2$] | 8.1 | 8.1 | 12.6 | 14.1 | 27.5 |
| Charpy NIS +23° C. | [kJ/m$^2$] | 4.2 | 4.2 | 6.4 | 6.0 | 6.9 |

Table 2 clearly shows that an increase of the ethylene content in the ethylene-$C_3$-$C_8$-α-olefin rubber copolymer being part of the thermoplastic polyolefin (TPO) composition leads to superior properties compared to known compositions in this technical field. In particular, the shrinkage as well as the coefficient of linear thermal expansion (CLTE) values are very low without compromising the mechanical properties, like toughness and stiffness.

We claim:

1. A thermoplastic polyolefin (TPO) composition having a melt flow rate MFR$_2$ (230° C.) between 20 and 100 g/10 min measured according to ISO 1133, comprising
   a) a matrix phase (M) comprising a propylene homopolymer (H-PP) and/or a propylene copolymer (R-PP), and
   b) a dispersed phase (D) comprising an ethylene-$C_3$-$C_8$-α-olefin rubber copolymer (EOP),
   wherein
   (i) the composition comprises 20 wt.-% to 45 wt.-%, based on the total weight of the composition, of a xylene cold soluble (XCS) fraction having
      (i-a) an ethylene content in the range of 40 wt.-% to 65 wt.-%, and
      (i-b) an intrinsic viscosity (IV) of below 1.5 dL/g measured according to ISO 1628, and
   (ii) the ratio of the intrinsic viscosity (IV) of xylene cold insoluble (XCI) fraction to the intrinsic viscosity (IV) of the xylene cold soluble (XCS) fraction ([XCS]/[XCI]) of the thermoplastic polyolefin (TPO) composition is in the range of 0.75 to 1.35,
   and wherein the composition comprises
   (a) 30 wt.-% to 45 wt.-%, based on the total weight of the composition, of the ethylene-$C_3$-$C_8$-α-olefin rubber copolymer (EOP).

2. The thermoplastic polyolefin (TPO) composition according to claim 1, wherein the composition comprises
   (a) 55 wt.-% to 70 wt.-%, based on the total weight of the composition, of the matrix phase (M),
   and/or
   (b) 55 to 80 wt.-%, based on the total weight of the composition, of the xylene cold insoluble (XCI) fraction.

3. The thermoplastic polyolefin (TPO) composition according to claim 1, wherein the matrix phase (M) is a propylene homopolymer.

4. The thermoplastic polyolefin (TPO) composition according to claim 1, wherein the matrix phase (M) and/or the xylene cold insoluble (XCI) fraction has/have a melt flow rate MFR$_2$ (230° C.) of at least 50 g/10 min measured according to ISO 1133.

5. The thermoplastic polyolefin (TPO) composition according to claim 1, wherein the matrix phase (M) and/or the xylene cold insoluble (XCI) fraction has/have an intrinsic viscosity (IV) measured according to ISO 1628 of below 1.5 dL/g.

6. The thermoplastic polyolefin (TPO) composition according to claim 1, wherein the ethylene-$C_3$-$C_8$-α-olefin rubber copolymer (EOP) and/or the xylene cold soluble (XCS) fraction has/have an ethylene content in the range of 40 wt.-% to 55 wt.-% based on the total weight of the ethylene-$C_3$-$C_8$-α-olefin rubber copolymer (EOP) and the xylene cold soluble (XCS) fraction, respectively.

7. The thermoplastic polyolefin (TPO) composition according to claim 1, wherein the ethylene-$C_3$-$C_8$-α-olefin rubber copolymer (EOP) is an ethylene-propylene or ethylene-1-octene copolymer rubber.

8. The thermoplastic polyolefin (TPO) composition according to claim 1, wherein the ethylene-$C_3$-$C_8$-α-olefin rubber copolymer (EOP) and/or the xylene cold soluble (XCS) fraction has/have an intrinsic viscosity (IV) measured according to ISO 1628 between 0.7 and 1.5 dL/g.

9. The thermoplastic polyolefin (TPO) composition according to claim 1, wherein the composition
   (a) is free of inorganic filler,
   and/or
   (b) is α-nucleated, i.e. comprises a α-nucleating agent in a total amount of below 1 wt.-%.

10. The thermoplastic polyolefin (TPO) composition according to claim 1, wherein the composition has a melt flow rate MFR$_2$ (230° C.) between 30 and 100 g/10 min measured according to ISO 1133.

11. The thermoplastic polyolefin (TPO) composition according to claim 1, wherein the ratio of intrinsic viscosity (IV) of the propylene homo- or copolymer matrix phase (M) to the intrinsic viscosity (IV) of the ethylene-$C_3$-$C_8$-α-olefin rubber copolymer (EOP) ([M]/[EOP]) is in the range of 0.75 to 1.35.

12. The thermoplastic polyolefin (TPO) composition according to claim 1, wherein the thermoplastic polyolefin (TPO) composition is a reactor grade thermoplastic polyolefin (rTPO) composition.

13. The thermoplastic polyolefin (TPO) composition according to claim 1, further comprising an injection moulded article.

14. The thermoplastic polyolefin (TPO) composition according to claim 13, wherein said injection molded article is an automotive part.

15. The thermoplastic polyolefin (TPO) composition according to claim 1, wherein the matrix phase (M) and/or the xylene cold insoluble (XCI) fraction has/have a melt flow rate MFR$_2$ (230° C.) of between 50 and 200 g/10 min measured according to ISO 1133.

16. The thermoplastic polyolefin (TPO) composition according to claim 1, wherein the matrix phase (M) and/or the xylene cold insoluble (XCI) fraction has/have a melt flow rate MFR$_2$ (230° C.) of between 80 and 200 g/10 min measured according to ISO 1133.

17. The thermoplastic polyolefin (TPO) composition according to claim 1, wherein the matrix phase (M) and/or the xylene cold insoluble (XCI) fraction has/have a melt flow rate MFR$_2$ (230° C.) of between 80 and 150 g/10 min measured according to ISO 1133.

18. The thermoplastic polyolefin (TPO) composition according to claim 1, wherein the matrix phase (M) and/or the xylene cold insoluble (XCI) fraction has/have an intrinsic viscosity (IV) measured according to ISO 1628 of between 0.7 and 1.5 dL/g.

19. The thermoplastic polyolefin (TPO) composition according to claim 1, wherein the matrix phase (M) and/or the xylene cold insoluble (XCI) fraction has/have an intrinsic viscosity (IV) measured according to ISO 1628 of between 0.8 and 1.4 dL/g.

20. The thermoplastic polyolefin (TPO) composition according to claim 1, wherein the matrix phase (M) and/or the xylene cold insoluble (XCI) fraction has/have an intrinsic viscosity (IV) measured according to ISO 1628 of between 1 and 1.2 dL/g.

21. The thermoplastic polyolefin (TPO) composition according to claim 1, wherein the ethylene-$C_3$-$C_8$-$\alpha$-olefin rubber copolymer (EOP) and/or the xylene cold soluble (XCS) fraction has/have an ethylene content in the range of 45 wt.-% to 55 wt.-% based on the total weight of the ethylene-$C_3$-$C_8$-$\alpha$-olefin rubber copolymer (EOP) and the xylene cold soluble (XCS) fraction, respectively.

22. The thermoplastic polyolefin (TPO) composition according to claim 1, wherein the ethylene-$C_3$-$C_8$-$\alpha$-olefin rubber copolymer (EOP) and/or the xylene cold soluble (XCS) fraction has/have an ethylene content in the range of 45 wt.-% to 50 wt.-% based on the total weight of the ethylene-$C_3$-$C_8$-$\alpha$-olefin rubber copolymer (EOP) and the xylene cold soluble (XCS) fraction, respectively.

23. The thermoplastic polyolefin (TPO) composition according to claim 1, wherein the ethylene-$C_3$-$C_8$-$\alpha$-olefin rubber copolymer (EOP) and/or the xylene cold soluble (XCS) fraction has/have an intrinsic viscosity (IV) measured according to ISO 1628 between 0.8 and 1.5 dL/g.

24. The thermoplastic polyolefin (TPO) composition according to claim 1, wherein the ethylene-$C_3$-$C_8$-$\alpha$-olefin rubber copolymer (EOP) and/or the xylene cold soluble (XCS) fraction has/have an intrinsic viscosity (IV) measured according to ISO 1628 between 0.9 and 1.4 dL/g.

25. The thermoplastic polyolefin (TPO) composition according to claim 1, wherein the composition has a melt flow rate $MFR_2$ (230° C.) between 30 and 90 g/10 min measured according to ISO 1133.

26. The thermoplastic polyolefin (TPO) composition according to claim 1, wherein the composition has a melt flow rate $MFR_2$ (230° C.) between 40 and 80 g/10 min measured according to ISO 1133.

27. The thermoplastic polyolefin (TPO) composition according to claim 1, wherein the ratio of intrinsic viscosity (IV) of the propylene homo- or copolymer matrix phase (M) to the intrinsic viscosity (IV) of the ethylene-$C_3$-$C_8$-$\alpha$-olefin rubber copolymer (EOP) ([M]/[EOP]) is in the range of 0.80 to 1.20.

28. The thermoplastic polyolefin (TPO) composition according to claim 1, wherein the ratio of intrinsic viscosity (IV) of the propylene homo- or copolymer matrix phase (M) to the intrinsic viscosity (IV) of the ethylene-$C_3$-$C_8$-$\alpha$-olefin rubber copolymer (EOP) ([M]/[EOP]) is in the range of 0.90 and 1.20.

* * * * *